US012534321B2

(12) United States Patent
Serra Obiol et al.

(10) Patent No.: US 12,534,321 B2
(45) Date of Patent: Jan. 27, 2026

(54) HANDLING SYSTEM FOR HANDLING SHEETS OF CARDBOARD OR SIMILAR MATERIAL

(71) Applicant: Comercial Industrial Maquinaria Carton Ondulado, S.L., Martorell (ES)

(72) Inventors: Ramón Serra Obiol, Martorell (ES); Jordi Puig Vargas, Martorell (ES)

(73) Assignee: Comercial Industrial Maquinaria Carton Ondulado, S.L., Martorell (ES)

( * ) Notice: Subject to any disclaimer, the term of this patent is extended or adjusted under 35 U.S.C. 154(b) by 307 days.

(21) Appl. No.: 18/030,778

(22) PCT Filed: Aug. 27, 2021

(86) PCT No.: PCT/ES2021/070625
§ 371 (c)(1),
(2) Date: Oct. 4, 2023

(87) PCT Pub. No.: WO2022/074265
PCT Pub. Date: Apr. 14, 2022

(65) Prior Publication Data
US 2024/0051774 A1    Feb. 15, 2024

(30) Foreign Application Priority Data
Oct. 7, 2020 (ES) .............................. ES202031017

(51) Int. Cl.
*B65H 5/14* (2006.01)
*B65H 5/00* (2006.01)
(Continued)

(52) U.S. Cl.
CPC ............... *B65H 5/14* (2013.01); *B65H 5/006* (2013.01); *B65H 5/12* (2013.01); *B65H 15/02* (2013.01);
(Continued)

(58) Field of Classification Search
CPC ............ B65H 2301/4224; B65H 15/02; B65H 5/006; B65H 1/30; B65H 3/242;
(Continued)

(56) References Cited

U.S. PATENT DOCUMENTS 4,618,341 A    10/1986   Oldham et al.
5,042,862 A *  8/1991    Tubke ................ B65H 31/3045
                                                  414/622
(Continued)

FOREIGN PATENT DOCUMENTS

EP    3466853    4/2019
ES    2644239    11/2017
(Continued)

OTHER PUBLICATIONS

Informe de Busqueda Internacional y Opinion Escrita [International Search Report and the Written Opinion] Dated Dec. 2, 2021 From the International Searching Authority Re. Application No. PCT/ES2021/070625 and Its Translation Into English. (10 Pages).

*Primary Examiner* — Gregory W Adams

(57) ABSTRACT

The present invention relates to a handling installation for handling sheets of cardboard or similar material applicable for implementation thereof in an automated production facility, comprising a first receiving station (1) configured to receive packages formed by cardboard sheets, each of the sheets being defined by four sides, and a second distribution station (2) in which the sheets are delivered face-down coming from the receiving station by means of sheet handling means. The first and second stations comprise modules that are independent from each other, the handling means comprising a robot arm provided with a head with clamping means to hold the package of sheets on any of the four sides, the head having a hinge point that can be coupled to a robot arm, capable of conveniently moving and orienting the (Continued)

clamping means in any of the coordinate axes, the robot arm being mounted on a base that is independent with respect to the first and second stations.

14 Claims, 9 Drawing Sheets

(51) Int. Cl.
 *B65H 5/12* (2006.01)
 *B65H 15/02* (2006.01)
(52) U.S. Cl.
 CPC ............... *B65H 2301/4223* (2013.01); *B65H 2301/4224* (2013.01); *B65H 2301/42264* (2013.01); *B65H 2701/176* (2013.01)
(58) Field of Classification Search
 CPC .......... B65H 2301/42242; B65H 3/322; B65H 2301/422; B65G 60/00; B65G 59/00; B65B 19/228
 USPC .... 414/795.9, 796, 796.2, 796.6, 783, 795.8
 See application file for complete search history.

(56) References Cited

U.S. PATENT DOCUMENTS

| | | | | |
|---|---|---|---|---|
| 5,092,828 A * | 3/1992 | Marchetti | ............... | B65H 1/30 493/309 |
| 5,240,102 A * | 8/1993 | Lucas | ................. | B65G 47/244 198/782 |
| 5,967,292 A * | 10/1999 | Corrales | .............. | B65G 47/244 198/457.07 |
| 6,230,872 B1 * | 5/2001 | Huang | ..................... | B07C 3/08 198/368 |
| 6,595,740 B1 * | 7/2003 | Drake | ..................... | B65H 1/00 271/157 |
| 7,018,163 B2 * | 3/2006 | Beavers | ............. | B65H 31/3045 414/772 |
| 7,631,744 B2 * | 12/2009 | Brommer | ................ | B42C 19/08 198/370.09 |
| 8,418,834 B2 * | 4/2013 | Sardella | ................ | B65H 3/242 414/796.4 |
| 9,221,622 B2 * | 12/2015 | Morency | ............ | B65G 47/8861 |
| 9,315,343 B1 | 4/2016 | Widder et al. | | |
| 2004/0240979 A1 | 12/2004 | Beavers et al. | | |
| 2017/0341259 A1 | 11/2017 | Underwood | | |
| 2020/0087089 A1 * | 3/2020 | Serra Obiols | ......... | B65H 15/02 |

FOREIGN PATENT DOCUMENTS

| | | |
|---|---|---|
| ES | 1222459 | 1/2019 |
| ES | 1227740 | 4/2019 |
| ES | 1229709 | 5/2019 |
| ES | 1234414 | 9/2019 |
| WO | WO 02/083531 | 10/2002 |
| WO | WO 2015/147725 | 10/2015 |

\* cited by examiner

HANDLING SYSTEM FOR HANDLING SHEETS OF CARDBOARD OR SIMILAR MATERIAL

RELATED APPLICATIONS

This application is a National Phase of PCT Patent Application No. PCT/ES2021/070625 having International filing date of Aug. 27, 2021, which claims the benefit of priority of Spain Patent Application No. P202031017 filed on Oct. 7, 2020. The contents of the above applications are all incorporated by reference as if fully set forth herein in their entirety.

FIELD AND BACKGROUND OF THE INVENTION

The object of the present application is to provide a handling installation for handling sheets of cardboard or similar material for an automated production facility.

More specifically, the invention proposes the development of an installation that falls within the technical field of installations for handling sheets or plates of cardboard of different dimensions (rectangular, quadrangular), in which the sheets are arranged in packages to be deposited in a feeding module to be subsequently printed on one or both sides.

The method for handling sheets or plates of cardboard subsequently intended, for example, for forming cardboard packages, which includes a prior printing step that is carried out by means of digital printings, is well known.

Digital printers print from above the upper face of each of the plates of cardboard or the like. Due to the high investment cost of the printing heads and the possibility of being able to print continuously, it means that the direction of travel of the sheets is normally along the longest side thereof.

Moreover, when flexographic printing machines are used for printing the cardboard plates, wherein the development of the rollers limits the length of the plates, these are introduced by the narrowest portion, unlike digital printers.

It is worth mentioning that the longest side of the cardboard plates can reach up to a length of up to 5.5 m.

During the manufacturing process of the plates and, in particular, plates made from corrugated cardboard, the side to be printed is normally in the bottom portion of the stack and it must be overturned to subsequently print the sheets on the digital printers.

To carry out this overturning action, there are different alternative systems on the market capable of unstacking plates and forming packages with multiple plates. However, all these known systems do so in line with the subsequent production unit, making it impossible to overturn large plates, in addition to the fact that in no case can they feed the feeding module with two packages of plates side by side.

Furthermore, the applicant is not currently aware of an invention that has all the features described in this specification.

SUMMARY OF THE INVENTION

The present invention has been developed with the aim of providing an installation which is configured as a novelty within the field of application and solves the aforementioned drawbacks, further contributing other additional advantages that will be obvious from the description below.

It is therefore an object of the present invention to provide an installation for handling sheets of cardboard or similar material, applicable for implementation thereof in an automated production facility, comprising a first receiving station configured to receive at least one package made up of a plurality of cardboard sheets (arranged one on top of the other) and a second distribution station in which the sheets are delivered face-down coming from the receiving station by means of sheet handling means.

Particularly, the invention is characterized in that the first and second stations comprise modules that are independent from each other, the handling means comprising a robot arm provided with a head with clamping means to hold, on any of the four sides, the package formed by multiple sheets, the head having a hinge point that can be coupled to a robot arm, capable of conveniently moving and orienting the clamping means in any of the three coordinate axes (x, y, z), the robot arm being mounted on a base that is independent from the first and second stations.

Thanks to these features, the sheet handling method is improved during the industrial process thereof since the use of the robot arm, for example, facilitates the handling of the sheets in different ways, for example, taking into account the shortest side of the same, as well as the fact of choosing whether or not a package of sheets must be overturned or not according to the needs of each case. The robot arm also enables the distribution of the first and second stations to be modified, that is to say, they can be aligned with each other or arranged in planes perpendicular to each other, which enables the installation space to be optimized.

Another advantage is also the fact that it enables the entire installation to be simplified, eliminating mechanisms, and endowing the installation with a great versatility. In this way, it is possible to reduce maintenance and manufacturing costs, as well as optimizing the surface required to mount the installation.

Another advantageous aspect of having a robot arm between the two stations is the fact that it can be programmed to deposit a stack of cardboard plates in an area that does not correspond to the second station, for example, in a rejection area, in a simple way and simply by programming the robot arm.

According to another feature of the object of the invention, the clamping means present on the robot arm comprise a fork structure made up of an upper arm and a lower arm arranged parallel to each other, the upper or lower arm being movable in an upward/downward direction with respect to the arm facing it, the arm being movable by means of guide means present on a support base.

Preferably, the first receiving station comprises conveyor belts positioned in a horizontal plane, press means configured to press the stack of sheets and push means to move a stack of sheets from a first position to a second position, so as to be subsequently clamped by the head of the robot arm. It should be noted that the conveyor belts can act by rotating in either of the two opposite directions of travel.

Also preferably, the second distribution station comprises the following portions:
 a first region provided with position-adjustable positioning means configured to locate a stack of sheets in predetermined coordinates (x, y), enabling each of the stacks of sheets to be positioned and centered with respect to a longitudinal axis of travel, and movement means; and
 a second region for moving provided with conveyor belts configured to move the stack of sheets in a direction of travel.

Preferably, the movement means of the first region comprise a plurality of rotating rollers (partly or fully motorized) arranged such that they move the stack of cardboard in the direction of travel.

Advantageously, the position-adjustable positioning means comprise blades that protrude vertically upwards capable of defining a rectangular area, such blades being capable of moving along guide gaps, i.e., the space between the aforementioned rotating rollers, in a perpendicular direction with respect to the direction of travel of the stack of sheets.

The installation described thus represents an innovative structure with structural and constitutive features heretofore unknown for its intended purpose, reasons which, taken together with its practical usefulness, provide it with sufficient grounds for obtaining the requested exclusivity privilege.

It is another object of the invention to provide a process for handling cardboard sheets in a handling installation such as the one described above, comprising the steps of:
 a) Supplying at least one package formed from a plurality of sheets arranged one on top of the other in a receiving station, such that a longitudinal axis of the cardboard sheet is oriented in the same direction of travel of the package during the movement of the package at said receiving station;
 b) Applying a pressure in a vertical orientation and a downward direction on the package of sheets by means of press means;
 c) Overturning the package of sheets by means of a robot arm configured to conveniently orient the package of sheets in any of the three coordinate axes (x, y, z); and
 d) Depositing the package of sheets in a distribution station, such that the longitudinal axis of the cardboard sheets that make up the package is oriented in the same direction as the direction of travel of movement means present in the distribution station.

According to another feature, after depositing the package of sheets in a distribution station it can include an additional step consisting of moving the package of cardboard sheets in the axes of spatial coordinates (x) and/or (y) when it is placed on the movement means by means of positioning means located in the distribution station.

Other features and advantages of the installation object of the present invention will be evident in light of the description of a preferred, but not exclusive, embodiment, which is illustrated by way of a non-limiting example in the attached drawings, wherein:

DESCRIPTION OF SPECIFIC EMBODIMENTS OF THE INVENTION

Figure 1:
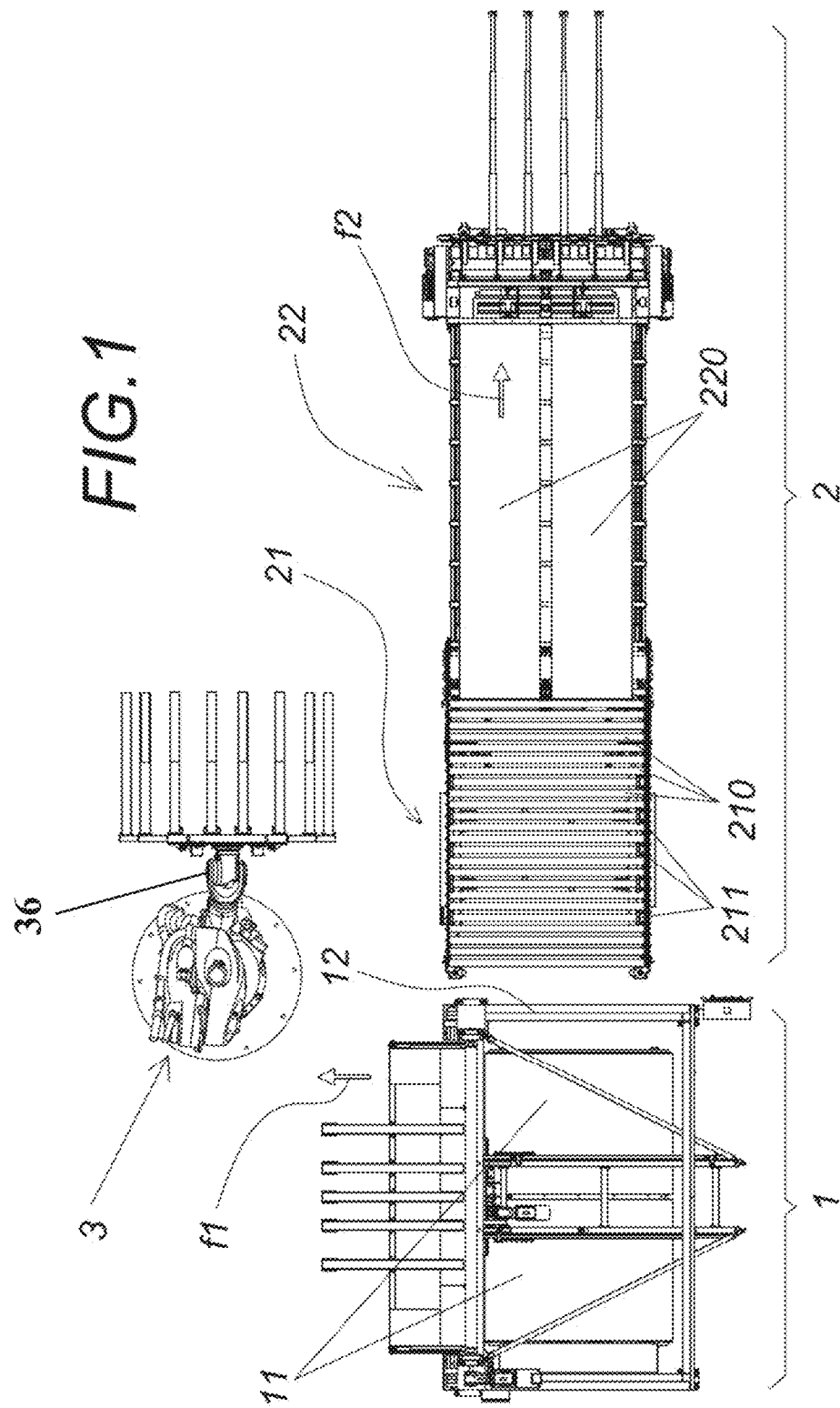
FIG. 1 is a plan view of a handling installation for sheets according to the present invention.
Figure 2:
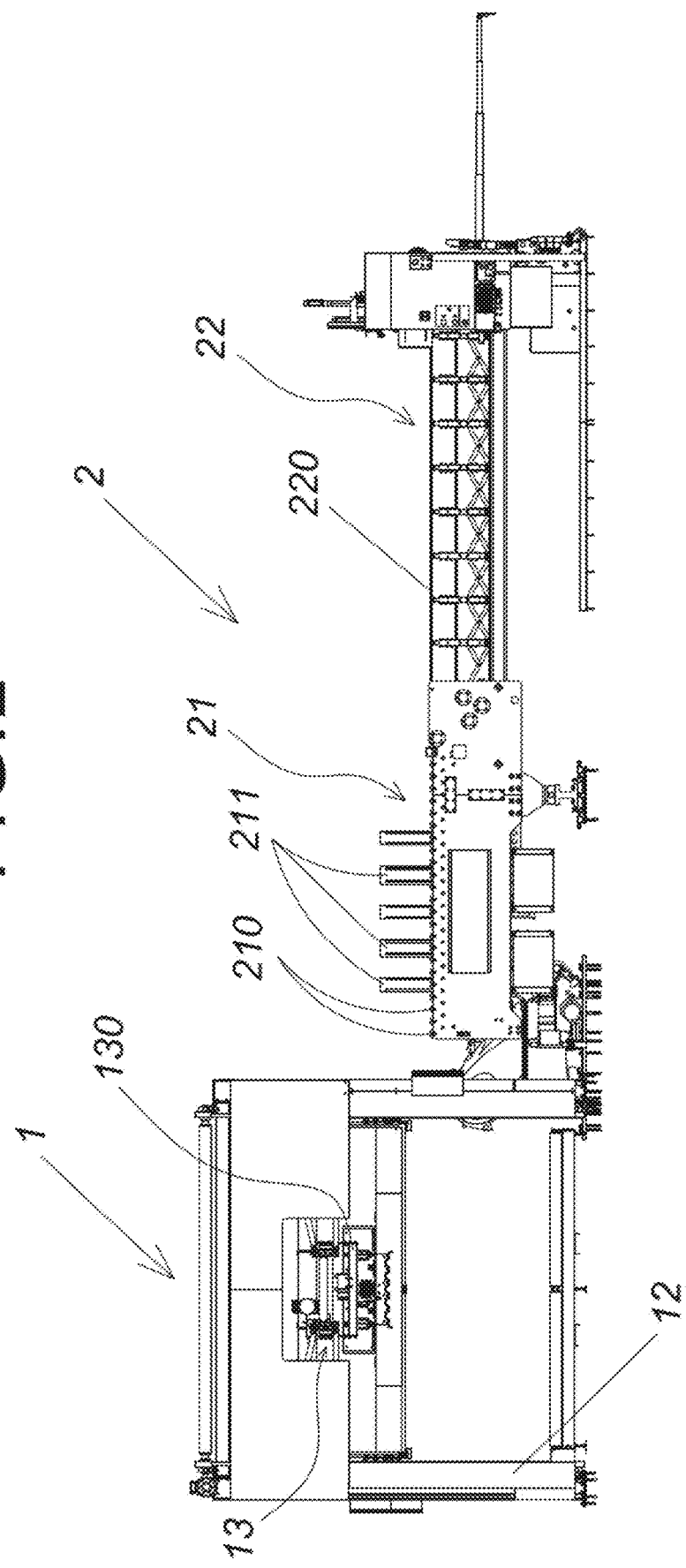
FIG. 2 is a side elevation view of the installation represented in FIG. 1.

In light of the aforementioned figures and, in accordance with the adopted numbering, one may observe therein a preferred exemplary embodiment of the invention, which comprises the parts and elements indicated and described in detail below.

As shown in the attached figures, an embodiment of the handling installation for handling sheets of cardboard or similar material for an automated production facility, comprises a first receiving station, generally indicated with the reference (1), being configured to receive a package made up of a plurality of cardboard sheets stacked one on top of the other and a second distribution station, generally indicated with the reference (2), in which a package of sheets is delivered after a step or not of overturning coming from the receiving station by means of sheet handling means that are described in greater detail below. The sheets exhibit a general rectangular or quadrangular shape defined by four sides.

It should be mentioned that in the embodiment by way of a preferred but non-limiting example, both the first station (1) and the second station (2) mentioned above are arranged in line with each other, the handling means comprising a robot arm (3) that will be described In greater detail below, arranged laterally with respect to the two stations (1), and (2), as can be seen more clearly in FIGS. 1 and 3.

Figure 5:
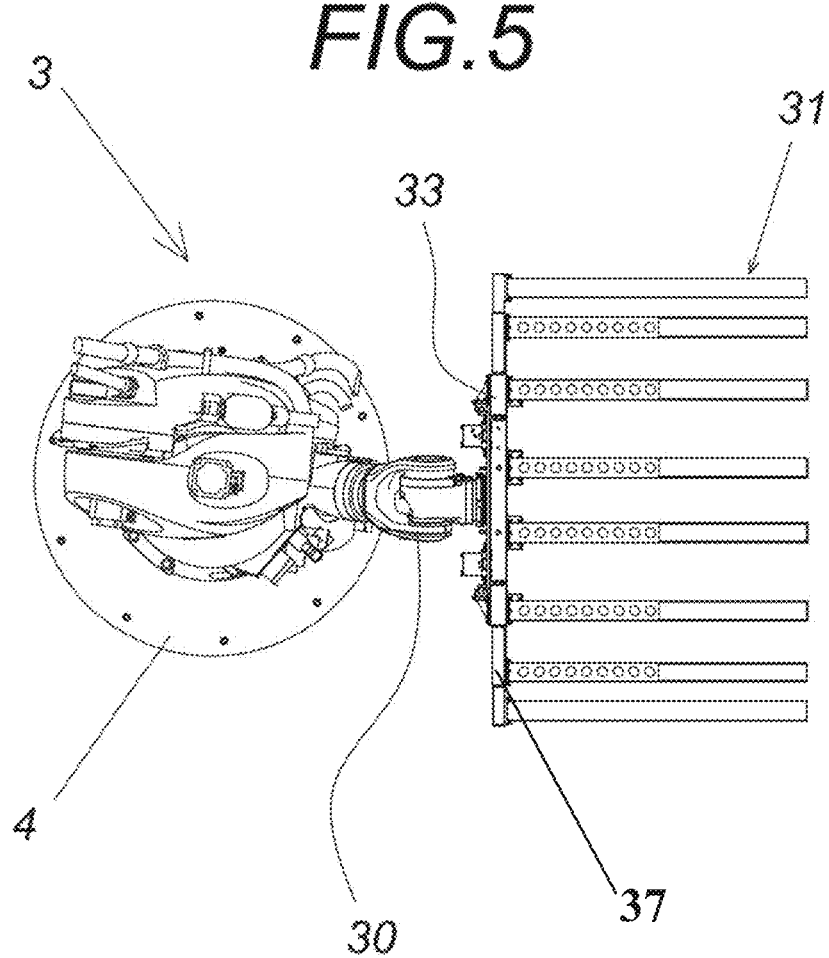
FIG. 5 is a detailed view of the robot arm that is part of the handling installation according to the invention.

Now placing emphasis on the robot arm (3), and as can be seen in FIG. 5, it is provided with multiple portions hinged with each other, being rotatably supported on a base (4) at a lower end. In addition, it is provided with a head (30) that holds clamping means to hold the package made up of sheets, the head having a hinge point that can be coupled to the robot arm (3), capable of conveniently moving and orienting the clamping means in any of the three coordinate axes (x, y, z) to facilitate the movement of a stack of cardboard sheets from the first station (1) to the second station (2). The arrangement of the robot arm (3) enables the option of overturning each package or not that it handles with the clamping means, and in addition it can be previously programmed to remove a package of plates at another point located outside each of the modules (or stations) that define the first and second stations, for example, for removal thereof from the manufacturing line.

The robot arm (3) is supported and rotatably hinged on a base (4) by means of conventional means that are known in the art, for which reason we will not go into greater detail in its description in this specification.

Now, as regards the aforementioned clamping means, they comprise a fork structure made up of an upper arm (31) and a lower arm (32) arranged parallel to each other, the upper or lower arm being movable in an upward/downward direction with respect to the arm facing it, and wherein the arm can be moved by means of guide means present on a support base (33).

Figure 6:
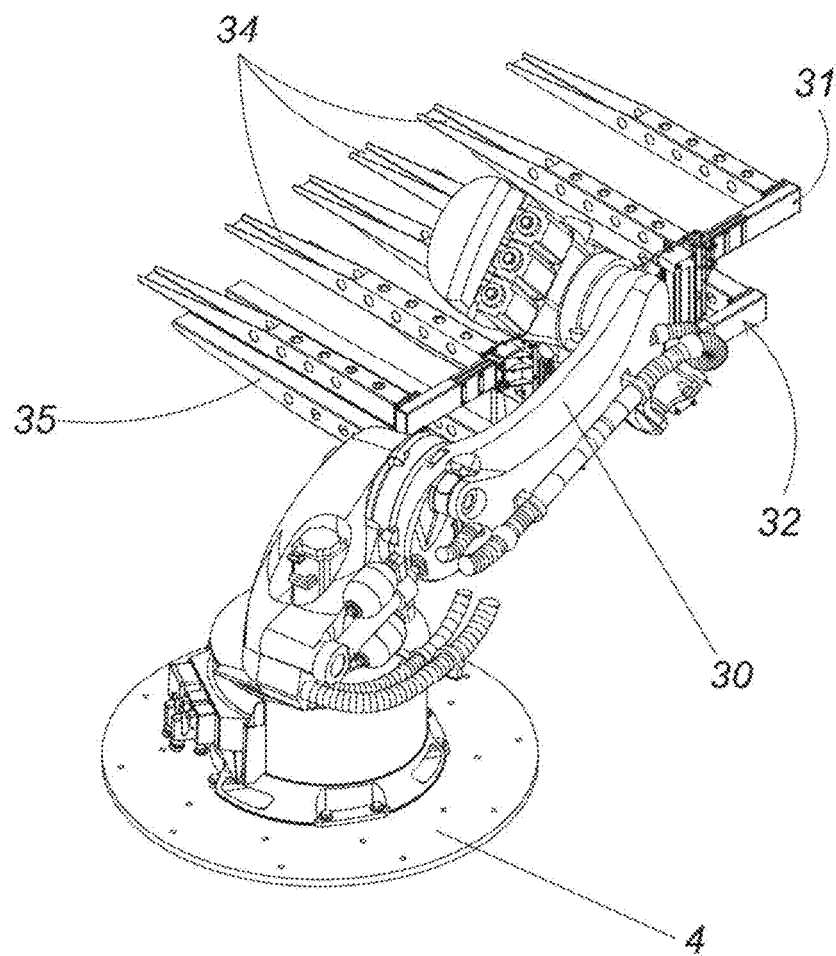
FIG. 6 is a perspective view of the robot arm of the installation.
Figure 7:
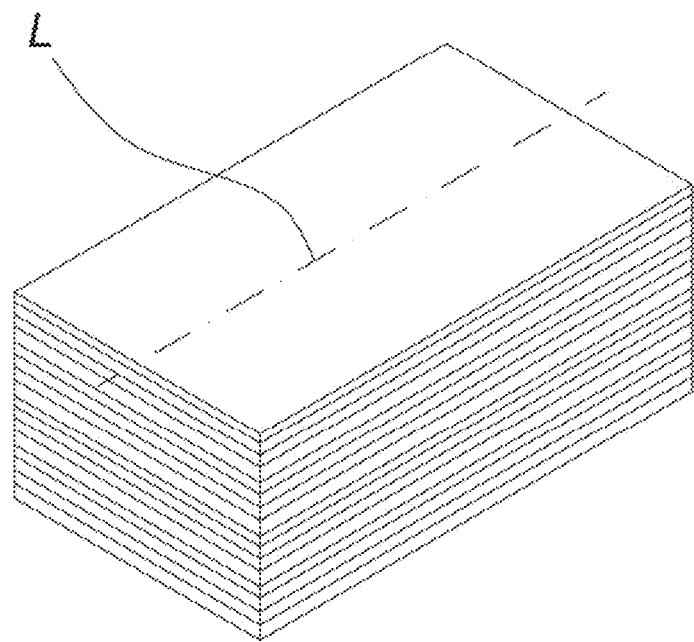
FIG. 7 is a view of a package of cardboard sheets wherein the longitudinal axis (L) of the sheets or package of sheets has been indicated.

As can be seen in FIG. 6, the upper arm (31) of the fork structure comprises a plurality of spikes (34) spaced apart from each other that protrude in a perpendicular plane with respect to the support base (33). In the same way, the lower arm (32) comprises a plurality of spikes (35) that protrude in a perpendicular plane with respect to the support base (33).

Figure 4:
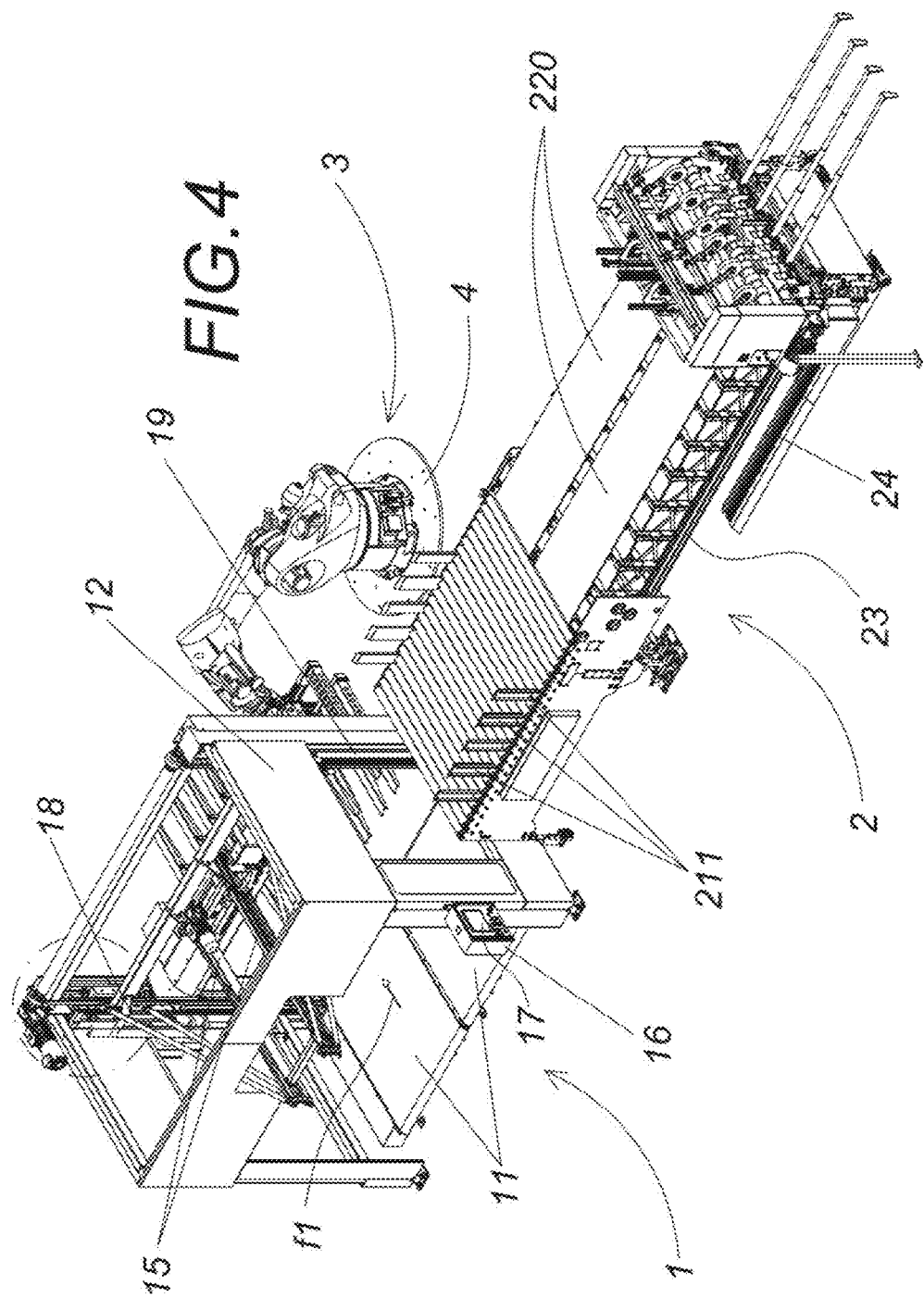
FIG. 4 is another perspective view of the installation represented in the previous figures.

Furthermore, referring again to the first receiving station (1), it comprises a plurality of conveyor belts (11) located on a bench (12), which can be in two directions of travel, which are positioned in a horizontal plane and that run parallel to each other that facilitate the movement of the package of sheets to be extracted in a direction (indicated by the arrow f1) perpendicular to the direction of travel (indicated by the arrow f2) of the package of sheets in the second distribution station (2). The various actuation systems present in the first receiving station (1) can be handled by means of a control panel (16) located at the rear of the bench (12), which can include a screen (17) intended to display and/or modify operating parameters, as can be seen in FIG. 4.

The first receiving station (1) further exhibits press means, generally indicated with the reference (13) configured to press the package of sheets when it is arranged on the conveyor belts (11), the means having a press plate (131) arranged horizontally capable of moving vertically, by means of a movable structure, adjustable in height in each handling process of a package of sheets, depending on the height of the package of sheets to be handled.

Additionally, the first station (1) also includes push means to move a stack of sheets from a first position, after the action of the aforementioned press means, to a second position corresponding to one end of the conveyor belts (11), wherein the robot arm will subsequently take the package of sheets to pass it to the second station (2). The robot arm (3) grips the package of cardboard sheets by the smaller side, and subsequently changes the orientation of the package of sheets in the second station.

These push means comprise a push plate (14) that is linked to two guides, generally indicated with the reference (15), fixedly mounted on the rear portion of the push plate (14), which are actuated by an electric motor, this push plate (14) being arranged in a vertical plane that moves in a horizontal plane to push the package of sheets so that it is subsequently handled (clamped) by the robot arm (3).

It should be noted that the press means, and the previously described push means are integrally mounted on a structure or upright (18) that is able to move axially vertically and horizontally, exhibiting guide means for vertical movement and guide means for horizontal movement. The vertical guide means comprise a pair of vertical guides (19) arranged at opposite ends of the bench (12), on which rails slide that are actuated by means of motor means (5). These rails are integrally joined by means of a crossbar (9).

Figure 4A:
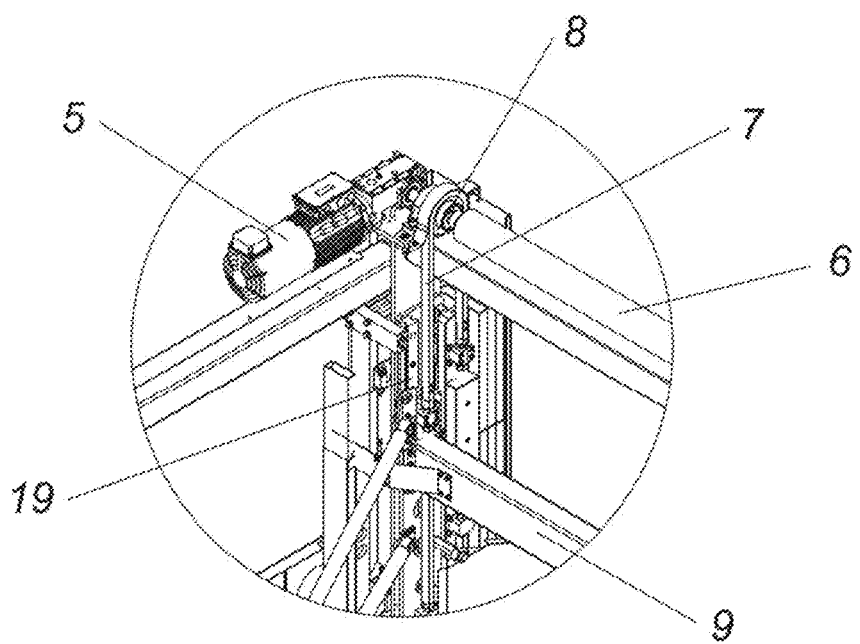
FIG. 4a is a partial perspective detailed view of an area indicated in FIG. 4 of the first station.

As can be seen in FIG. 4a, these motor means (5) are located in the upper portion of the bench (12) such that it transmits the vertical movement to the two rails by means of a rotation axis (6). At each of the ends of the rotation axis (6) a toothed belt (7) is coupled through toothed pinions (8) that transform the movement of rotation of the rotation axis (6) into a vertical movement of the rails.

Now, referring particularly to the second distribution station (2), it comprises a first region (21) provided with position-adjustable positioning means, which will be described later in more detail, which are configured to more precisely locate a package of sheets in predetermined spatial coordinates (x) and/or (y). Furthermore, there is also a second movement region (22) provided with a pair of conveyor belts (220), arranged in parallel to each other, configured to move one or two packages of sheets (parallel to each other) in the direction of travel (f2) to be subsequently handled in a conventional digital printing station (not shown). Such conveyor belts (220) are actuated by means of conventional actuation means, such as, for example, a servomotor that acts on at least one drive pulley located at one of the ends of the closed loop that defines the conveyor belt (220), such that we will not go into greater detail in its description as it is an actuation system known in the current state of the art.

Advantageously, the second movement region (22) wherein the conveyor belts (220) are located includes an extensible system, such that it enables the length of the movement region to be modified depending on the needs during the manufacturing process, for example, to adapt to different measures of cardboard sheets depending on the speed of travel thereof.

The extensible system comprises a support structure that is fixed at one end in a fixed way, generally indicated with the reference (23), which is provided with multiple regions, the adjacent regions of which are able to be hinged with each other, the support structure exhibiting a guide system for the linear movement of travel and reverse of the structure. The guide system exhibits two guide profiles (24) fixedly mounted on the ground, on which a complementary profile (27) can slide in each one of them, integrally mounted on the support structure (23).

Figure 3:
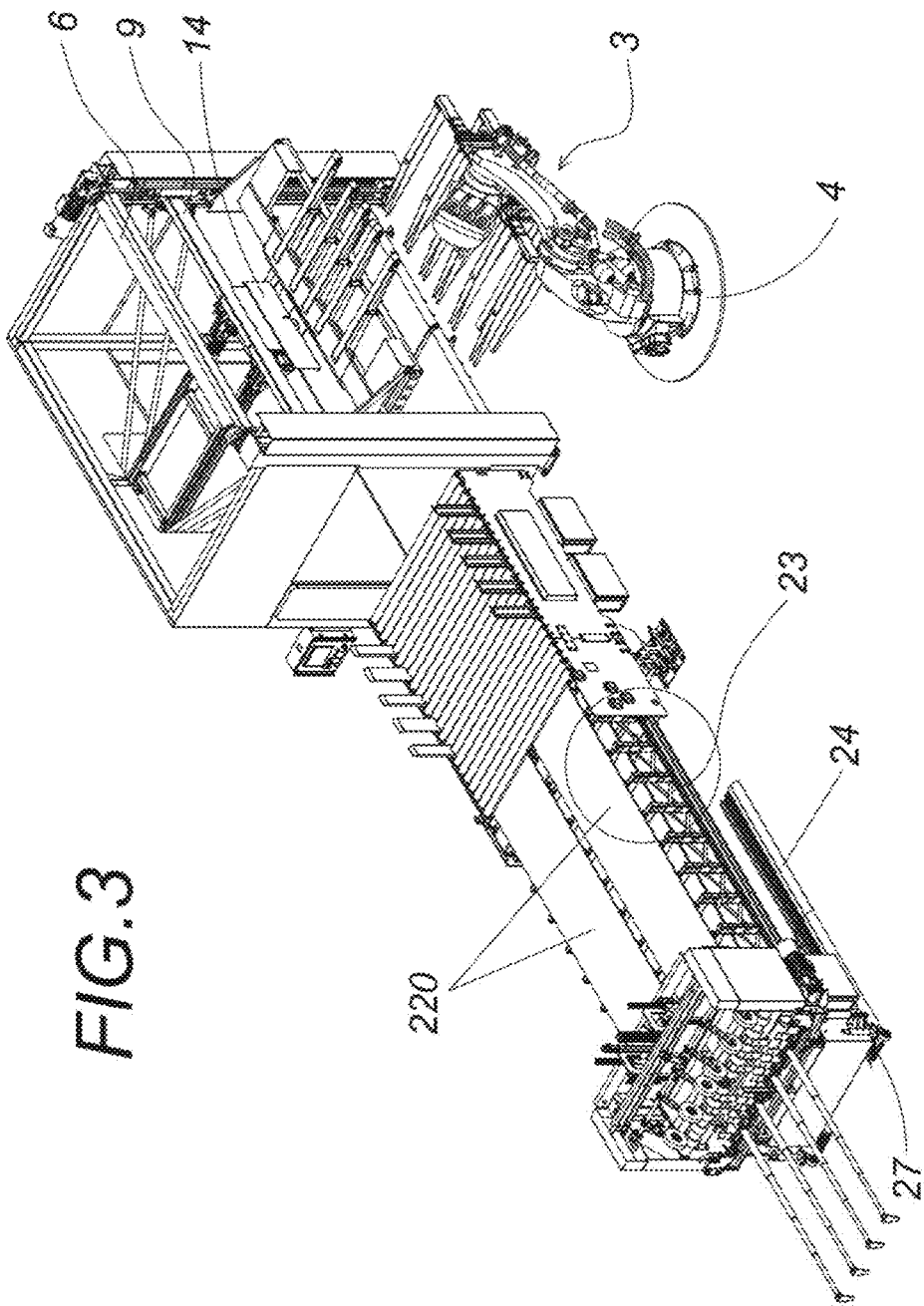
FIG. 3 is a perspective view of the installation represented in the previous figures.
Figure 3A:
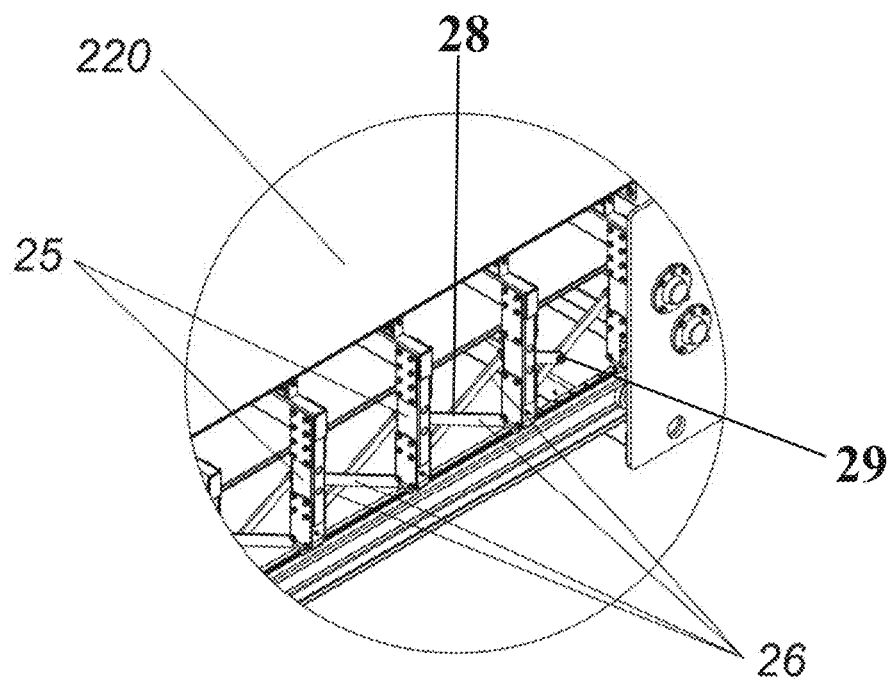
FIG. 3a is a partial perspective detailed view of an area indicated in FIG. 3 of the second station.

As can be seen more clearly in FIGS. 3 and 4, the regions consist of cells, each cell being provided with vertical struts (25) and interlocking profiles (26) that take a cross-shaped arrangement that are hinged by means of a shaft to the vertical struts (25), such that the distance between vertical struts (25) can vary in length if necessary with the help of the also present guide means.

The first region (21) includes movement means comprising a plurality of rotating rollers (210) arranged in a horizontal plane such that they move one or more cardboard packages in the direction of travel (f2) (see FIG. 1). The rotating rollers (210) can rotate by means of a belt system that acts on axes associated with each of the rotating rollers, so that when the belts move, they transmit the movement thereof to the rotating rollers (210).

Moreover, the position-adjustable positioning means comprise blades (211) (each formed by elongated metal bodies) that protrude vertically upwards, grouped in such a way that they are capable of defining a rectangular area in the zone where the rotating rollers (210) are, such blades (211) being capable of moving along guide gaps, said gaps corresponding to a separation between adjacent rotating rollers (210). These blades (211) can move in an axial direction (indicated with the reference P) that is perpendicular with respect to the direction of travel (f2) of the package of sheets, by means of a conventional actuation and guide system. These blades (211) enable the packages of cardboard sheets to be adjusted and squared, as well as to position them in the correct direction on the rotating rollers (210) for them to slide therethrough.

It is worth mentioning the operation of the actuated means and movement means present in the first receiving station and the second distribution station (2) and the movements carried out by the robot arm are synchronized by means of operational parameters that have been previously determined and entered in a control unit.

The details, shapes, dimensions, and other secondary elements used in the manufacture of the installation of the invention may be suitably replaced with others that do not depart from the scope defined by the claims included below.

The invention claimed is:

1. A handling installation for handling sheets of cardboard or similar material applicable for implementation thereof in an automated production facility, comprising:

a first receiving station configured to receive at least one package formed by a plurality of cardboard sheets, each one of the sheets defined by four sides, and a second distribution station in which the sheets are delivered facedown coming from the receiving station by a robot arm wherein the first and second stations comprise modules that are independent from each other, wherein the robot arm provided with a head with clamping means to hold the package formed by sheets on any of the four sides, the head having a hinge point that can be coupled to a robot arm, capable of conveniently moving and orienting the clamping means in any of the three coordinate axes (x, y, z), the robot arm being mounted on a base that is independent with respect to the first and second stations wherein the first receiving station comprises conveyor belts positioned in a horizontal plane, press means configured to press the stack of sheets and push means to move a stack of sheets from a first position to a second position, wherein the press means and the push means are integrally mounted on a structure that is able to move axially vertically and horizontally, wherein a pair of vertical guides is arranged at opposite ends of the bench, on which rails slide that are actuated by a motor, wherein the motor transmit a vertical movement to the two rails by a rotation axis, each of the ends of the rotation axis being provided with toothed pinions to be coupled to a toothed belt.

2. A handling installation for handling sheets of cardboard or similar material applicable for implementation thereof in an automated production facility, comprising:

a first receiving station configured to receive at least one package formed by a plurality of cardboard sheets, each one of the sheets defined by four sides, and a second distribution station in which the sheets are delivered facedown coming from the receiving station by a robot arm, wherein the first and second stations comprise modules that are independent from each other, wherein the robot arm provided with a head with clamping means to hold the package formed by sheets on any of the four sides, the head having a hinge point that can be coupled to a robot arm, capable of conveniently moving and orienting the clamping means in any of the three coordinate axes (x, y, z), the robot arm being mounted on a base that is independent with respect to the first and second stations, wherein the second distribution station comprises: a first region provided with position-adjustable positioning means configured to locate a stack of sheets at predetermined coordinates (x, y) and movement means; and a second movement region provided with conveyor belts configured to move the stack of sheets in a direction of travel;

wherein the movement means for moving the first region comprise a plurality of rotating rollers arranged such that they move at least one stack of cardboard in the direction of travel.

3. The handling installation according to claim 2, wherein the clamping means present on the robot arm comprise a fork structure made up of an upper arm and a lower arm arranged parallel to each other, the upper or lower arm being movable in an upward/downward direction with respect to the arm facing it, the arm being movable by a guide present on a support base.

4. The handling installation according to claim 3, wherein the upper arm of the fork structure comprises a plurality of spikes spaced apart from each other that protrude in a perpendicular plane with respect to the support base.

5. The handling installation according to claim 3, wherein the lower arm comprises a plurality of spikes that protrude in a perpendicular plane with respect to the support base.

6. The handling installation according to claim 2, wherein the first receiving station comprises conveyor belts positioned in a horizontal plane, press means configured to press the stack of sheets and push means to move a stack of sheets from a first position to a second position.

7. The handling installation according to claim 6, wherein the press means and the push means are integrally mounted on a structure that is able to move axially vertically and horizontally.

8. The handling installation according to claim 2, wherein the position-adjustable positioning means comprise blades that protrude vertically upwards capable of defining a rectangular area, such blades being capable of moving along guide gaps defined between rotating rollers, in a perpendicular direction with respect to the direction of travel of the package of sheets.

9. The handling installation according to claim 2, wherein the second movement region is provided with a pair of conveyor belts, arranged parallel to each other, to move the packages of sheets in the direction of travel.

10. The handling installation according to claim 2, wherein the second movement region includes an extensible system, such that the length of the movement region is variable.

11. The handling installation according to claim 10, wherein the extensible system comprises a support structure provided with multiple regions, the adjacent regions of which are able to be hinged with each other, the support structure exhibiting a guide system for the linear movement of travel and reverse of the structure.

12. The handling installation according to claim 11, wherein the regions consist of cells, each cell being provided with vertical struts and profiles that take a cross-shaped arrangement that are hinged by a shaft to the struts, such that the distance between vertical struts can vary in length.

13. A handling process for cardboard sheets in a handling installation according to claim 2, wherein it comprises the steps of:

a) Supplying at least one package formed from a plurality of sheets arranged one on top of the other in a receiving station, such that a longitudinal axis of the cardboard sheet is oriented in the same direction of travel of the package during the movement of the package at said receiving station;

b) Applying a pressure in a vertical orientation and a downward direction on said at least one package of sheets by a press means;

c) Overturning the package of sheets by a robot arm configured to conveniently orient the package of sheets in any of the three coordinate axes (x, y, z); and d) Depositing the package of sheets in a distribution station, such that the longitudinal axis of the cardboard sheets that make up the package is oriented in the same direction as the direction of travel corresponding to the movement means present in the distribution station.

14. The handling process for cardboard sheets according to claim 13, wherein after depositing the package of sheets in the second distribution station it includes a step of moving the package of cardboard sheets 5 in the spatial coordinate axes (x) and/or (y) of a horizontal plane when the package is placed on the movement means, the positioning being carried out by positioning means located in the second distribution station.

* * * * *